Figure 1:
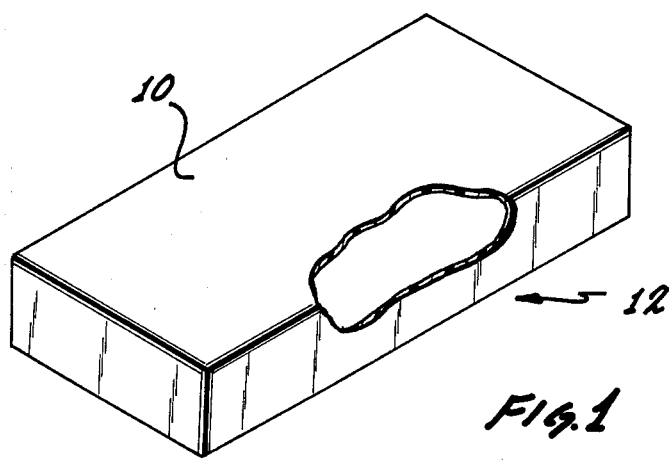

United States Patent [19]

Lybrand

[11] 4,393,176

[45] Jul. 12, 1983

[54] ANTI-STATIC MATERIAL AND METHOD OF MAKING THE MATERIAL

[75] Inventor: William Lybrand, Northridge, Calif.

[73] Assignee: Bengal, Inc., Sepulveda, Calif.

[21] Appl. No.: 327,471

[22] Filed: Dec. 4, 1981

[51] Int. Cl.³ ............................................. C09K 3/16
[52] U.S. Cl. ........................... 525/379; 260/DIG. 19; 260/DIG. 21; 525/329.3; 525/333.6; 525/380
[58] Field of Search ............... 525/379, 380, 360, 370, 525/333, 335, 329.3, 333.6; 260/DIG. 19, DIG. 21

[56] References Cited

U.S. PATENT DOCUMENTS

| | | | |
|---|---|---|---|
| 2,992,199 | 7/1961 | Coler et al. | 260/DIG. 16 |
| 3,223,664 | 12/1965 | Conlon | 260/DIG. 16 |
| 3,223,695 | 12/1965 | Gallaugher | 524/910 |
| 3,299,006 | 1/1967 | Tomiyama et al. | 524/912 |
| 3,365,437 | 1/1968 | Marra et al. | 524/587 |
| 3,435,021 | 3/1969 | Rombusch et al. | 524/587 |
| 3,445,396 | 5/1969 | Funatsu et al. | 524/249 |
| 3,478,096 | 11/1969 | Cyba | 524/243 |
| 3,485,786 | 12/1969 | Rombusch et al. | 524/243 |
| 3,575,903 | 4/1971 | Rombusch et al. | 524/247 |
| 3,631,162 | 12/1971 | McGaugh et al. | 524/247 |
| 3,658,744 | 4/1972 | Brindell et al. | 260/DIG. 19 |
| 3,745,116 | 7/1973 | Brindell et al. | 260/DIG. 15 |
| 3,867,315 | 2/1975 | Tigner et al. | 524/587 |
| 3,975,325 | 8/1976 | Long | 524/913 |
| 4,147,742 | 4/1979 | Castro et al. | 524/223 |
| 4,210,556 | 7/1980 | Castro et al. | 528/212 |
| 4,247,498 | 1/1981 | Castro | 264/49 |
| 4,314,040 | 2/1982 | Castro et al. | 525/391 |

FOREIGN PATENT DOCUMENTS

| | | | |
|---|---|---|---|
| 50-2753 | 1/1975 | Japan | 524/587 |
| 519448 | 8/1976 | U.S.S.R. | 524/243 |

Primary Examiner—Ronald W. Griffin
Attorney, Agent, or Firm—Ellsworth R. Roston; Charles H. Schwartz

[57] ABSTRACT

A thermoplastic material formed from a hydrocarbon chain is modified to inhibit the production of static charges. The thermoplastic material may be a modified styrene or a polystyrene. A chemical agent is dispersed in the thermoplastic material and is provided with properties of combining with the carbon molecules in the modified styrene or the polystyrene. The chemical agent may be an amine. The amine is preferably ethoxylated.

The polystyrene may be a crystal styrene or a high impact styrene. The amount of the ethoxylated amine in the material is dependent to some extent upon whether the polystyrene is a crystal styrene or a high impact styrene.

The material of this invention may be formed as sheets as by extrusion or may be injection molded into different members such as panels. The material may be formed by mixing the ethoxylated amine and the polystyrene and extruding the mixture under conditions of controlled temperatures and pressures and for controlled dwell times.

20 Claims, 1 Drawing Figure

U.S. Patent  Jul. 12, 1983  4,393,176

ANTI-STATIC MATERIAL AND METHOD OF MAKING THE MATERIAL

This invention relates to anti-static materials and to methods of producing such materials. More particularly, the invention relates to materials produced by a mixture of thermoplastic materials formed from hydrocarbon chains and of components modifying such chains to inhibit the formation of anti-static charges on or in such thermoplastic materials. The invention also relates to methods of producing such modified thermoplastic materials. The invention is particularly concerned with the inhibition of static charges in polystyrene and modified styrene.

Electrical equipments now in use tend to have casings and covers which are made from a thermoplastic material such as hydrocarbons in long polymeric chains. Such casings are advantageous because they are attractive and are relatively inexpensive and because they provide physical protection to the electrical apparatus within the casing and cover. Electrical equipments now in use also tend to include thermoplastic members which provide electrical insulation and which serve as supports for electrical members such as resistors.

The casings and covers and insulating members made from thermoplastic material have certain critical disadvantages. One such critical disadvantage is that the casings and covers and insulating members tend to accumulate static charge. This static charge limits the operability of the electrical equipment since it tends to produce arcing between the casing, cover or insulating member and different electrical components in the casing and also tends to produce capacitive effects in the equipment. The equipment is accordingly unpredictable in operation and actually may not operate properly at times. The static charge also tends to produce arcing to any person trying to touch the casing. Such arcing is inconvenient, annoying and sometimes dangerous to the person operating the equipment.

The accumulation of static charges on casings and covers and insulating members made from thermoplastic material has been recognized as a serious problem for many years. During this period of time, a considerable effort has been made to overcome such problems. In spite of such effort, such problems have continued to plague manufacturers and suppliers of electrical equipment. For example, the thermoplastic material now in use has either tended to accumulate static charges or has been so altered in properties by changes made in the thermoplastic material as to be electrically conductive. Alternatively, the properties of the thermoplastic material have been altered so that the casings and covers formed from such materials have not provided adequate mechanical protection to the electrical equipment.

This invention provides thermoplastic material in which the accumulation of static charges is inhibited. The invention includes chemical components which are added to the thermoplastic material to reduce the electrical resistivity of the material to a value which still causes the material to be electrically insulating while producing a leakage of electrical charges which tend to accumulate on a static basis on or in the material. The thermoplastic material constituting this invention is uniform throughout its volume so that the ability of the material to dissipate electrical charges continues indefinitely without any degradation in the properties of the material.

In one embodiment of the invention, a thermoplastic material formed from a hydrocarbon chain is modified to inhibit the production of static charges. The thermoplastic material may be a polystyrene or a modified styrene. In the embodiment of the invention, a chemical agent is dispersed in the thermoplastic material and is provided with properties of bonding to ions such as carbon items in the thermoplastic material. The chemical agent may be an amine when the thermoplastic material is a polystyrene or a modified styrene. The amine is preferably ethoxylated.

The polystyrene or modified styrene may be a crystal styrene or a high impact styrene. The amount of the ethoxylated amine in the material is dependent to some extent upon whether the polystyrene is a crystal styrene or a high impact styrene.

The material of this invention may be formed as sheets as by extrusion or may be injection molded into different members such as panels. The material may be formed by mixing the ethoxylated amine and the polystyrene and extruding the mixture under conditions of controlled temperatures and pressures and for controlled dwell times.

The single FIGURE is a perspective view, partially broken away, of one embodiment of the invention.

In one embodiment of the invention, a thermoplastic material constituting a polymer formed from long hydrocarbon chains is adapted to be modified to cause the material to be anti-static. The thermoplastic material normally has an electrical resistivity of at least $10^{15}$ to $10^{17}$ ohms. When the thermoplastic material has such a high electrical resistivity, it tends to accumulate static charges. However, when the material is modified to provide an electrical resistivity less than $10^{12}$ ohms, any static charges forming in the material tend to be dissipated. The modified material of this invention is particularly advantageous because it provides an electrical resistivity in the order of $10^{11}$ to $10^{12}$ ohms depending upon the humidity of the atmosphere. This resistivity provides for a dissipation of static charges while still causing the thermoplastic material to provide an electrical insulation.

The thermoplastic material of this invention is preferably polystyrene or a modified styrene. The polystyrene may be a crystal styrene or a high impact styrene. The modified styrene may be a vacuum forming grade having a low melting temperature and an index of approximately 2.2 or it may be a foaming grade having an increased melting temperature and an index of approximately 2.6. By way of illustration, the modified styrene may be an acrylonitrile butadiene styrene (ABS).

Amines are mixed with the polystyrene and the modified styrene to form the modified material of this invention. The amines have properties of flowing and mixing and blending well with polystyrene. Since the amines are hydrocarbon derivatives, they tend to become locked to the polystyrene structures. The amines also become chemically bonded to the carbon atoms in the polystyrene and the modified styrene so as to produce an ionic path through the polystyrene and the modified styrene. This ionic path reduces the electrical resistivity of the polystyrene and the modified styrene so as to dissipate static charges which form on the material or migrate to the material.

The amines mixed with the styrenes are preferably ethoxylated. When the amines are ethoxylated, the ether groups in the amines tend to initiate reactions and the oxygen group then tends to become bonded to the carbon atoms in the styrene. The combination of the oxygen atoms in the amines with the carbon atoms in the styrene tends to be in the form of a double bond.

When acrylonitrile butadiene styrene is used, the ethoxylated amines are mixed with the styrene in a concentration of approximately four percent (4%) to ten percent (10%) by weight. The ethoxylated amines are provided in such percentages because the styrene is quite crystalline and the amines tend to become bonded to the carbon atoms in the amorphous portion of the styrene. For example, acrylonitrile butadiene styrene tends to be approximately ninety percent (90%) crystalline and approximately ten percent (10%) amorphous. Since the carbon atoms in approximately only ten percent (10%) of the styrene is available for chemical bonding with the amines, an excess of amines tends to be mixed with the styrene to assure that a sufficient electrical conductivity is provided in the styrene for the removal of static charges.

When acrylonitrile butadiene styrene is used, the acrylic and the styrene tend to be crystalline and the rubber tends to impart amorphous characteristics to the styrene. The relative crystallinity of the material accordingly varies with the composition of the material. For example, Monsanto markets an acrylonitrile butadiene styrene under the trademark "Lustran". This material tends to be approximately fifteen percent (15%) amorphous. Since the amorphous characteristics of this material are enhanced, the material is especially desirable for use in anti-static applications.

Polystyrene tends to be at least as crystalline, if not slightly more crystalline, than acrylonitrile butadiene styrene. The amount of amines mixed with the polystyrene is accordingly increased slightly above the amount mixed with the acrylonitrile butadiene styrene. For example, the amount of amines mixed with the polystyrene may be in the range of eight percent (8%) to twelve percent (12%) by weight.

Different types of polystyrene can be used. For example, the polystyrene can be a crystal styrene or a high impact styrene. The polystyrene can be non-formed or it can be structurally formed. For example, a grade of polystyrene designated by General Electric by the trademark "Norell" has been found to be particularly advantageous. Such a polystyrene constitutes a high grade with high impact strength, high heat resistance and high heat reflection.

The materials of this invention may be mixed and then extruded by the use of a conventional extruder. During the extrusion, the temperature of the material should preferably not exceed a limit such as approximately 450° F. when polystyrene is used and the temperature should preferably not exceed a limit such as approximately 395° F. when acrylonitrile butadiene styrene is used. Preferably, the temperature of the material during the extrusion is slightly below the limits specified above. The pressure on the material should preferably not exceed a limit such as approximately eight hundred (800) to one thousand (1000) pounds per square inch when the extruder is vented.

The dwell time on the material during the extrusion preferably has a limit such as approximately two (2) minutes to three (3) minutes. This dwell time can be attained, if necessary, by disposing screens to partially block the flow of the material from the extruder. The dwell time should be properly regulated because an excessive dwell time will cause the material to become scorched. Scorching is undesirable because it tends to produce carbon molecules which provide electrical conductivity. As a result, the conductivity throughout the material tends to be uneven.

Amines tend to melt at a temperature of approximately 220° F. and tend to form gases at a temperature of approximately 400° F. to 425° F. Since the extrusion operation tends to occur at a temperature approaching the temperature at which the amines form gases, the dwell time for the extrusion is made as short as possible.

When the extruder is vented, the amount of the amines in the mixture can be increased. This results from the fact that some of the amines may escape from the mixture as a result of the venting. The amount of the additional amines in the mixture is preferably increased by an amount of approximately one percent (1%) to three percent (3%) above the amount which would be used if the material were not vented during the extrusion.

Polystyrene and modified styrenes such as acrylonitrile butadiene styrene tend to have a resistivity such as $10^{17}$ to $10^{19}$ ohms. Such a high resistivity tends to cause static charges to accumulate on the material. By modifying such materials in accordance with the methods of this invention, the resistivity of the material tends to become reduced to a value in the order of $10^{11}$ to $10^{12}$ ohms. This resistivity is sufficiently low for the static charges in the material to become dissipated. For example, static charges tend to become dissipated in a relatively short time such as a time in the order of five (5) seconds.

The materials formed in accordance with this invention have other important advantages. For example, the material provides a shield or barrier against radio frequency interference (RFI) and electromagnetic interference (EMI) so as to reduce such signals to acceptable levels. Such signals are illustratively reduced to a level of 50 db. This is considerably below a level of 70 db at which damage to a human ear can occur. Furthermore, at a level of 70 db, reception by an aircraft receiver or a television receiver becomes distorted.

The materials of this invention may be extruded in the form of sheets 10. The sheets 10 may be shaped to provide panels, generally indicated at 12, for casings and covers for housing electrical equipment. The sheets 10 may also be formed as members for holding such electrical components as resistors, capacitors and switches.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for eliminating static charges by providing a resistivity in the range of approximately $10^{11}$ to $10^{12}$ ohms,
    a first material selected from a group selected from a group consisting of polystyrene and modified styrenes, and
    ethoxylated amines mixed with the first material in a range of approximately four percent (4%) to twelve percent (12%) by weight.

2. The combination set forth in claim 1 wherein
    the first material is a polystyrene and the ethoxylated amines are mixed with the polystyrene in a range of eight percent (8%) to twelve percent (12%) by weight.

3. The combination set forth in claim 1 wherein the polystyrene and modified styrenes have a low specific gravity.

4. The combination set forth in claim 3 wherein approximately eighty five percent (85%) to ninety percent (90%) of the first material is crystalline and the remainder is amorphous.

5. The combination set forth in claim 1 wherein the first material is a modified styrene and the modified styrene is an acrylonitrile butadiene styrene and the ethoxylated amines are mixed in the modified styrene in a range of approximately four (4%) to ten percent (10%) by weight.

6. In combination for eliminating static charges by providing a resistivity in the range of approximately $10^{11}$ to $10^{12}$,
a thermoplastic material selected from a group consisting of a polystyrene and a modified styrene where the polystyrene is selected from a group consisting of the crystal and high impact type and the modified styrene is selected from a group consisting of a vacuum-forming grade with an index of approximately 2.2 and a low melting temperature and a foaming grade with an index of approximately 2.6 and an increased melting temperature, and
an ethoxylated amine mixed in the thermoplastic material in the range of approximately four percent (4%) to twelve percent (12%) by weight.

7. The combination set forth in claim 6, including, the thermoplastic material constituting a polystyrene and the ethoxylated amine mixed in the polystyrene in a range of approximately eight (8%) to twelve percent (12%) by weight.

8. The combination set forth in claim 6 wherein the thermoplastic material is a modified styrene and the ethoxylated amine is mixed in the modified styrene in the range of four (4%) to ten percent (10%) by weight.

9. The combination set forth in claim 8 wherein the thermoplastic material constitutes polystyrene and
the chemical agent is dispersed throughout the polystyrene in the range of approximately eight percent (8%) to twelve percent (12%) by weight.

10. The combination set forth in claim 8 wherein the modified styrene is selected from a group consisting of a vacuum forming grade with an index of refraction of approximately 2.2 and a low melting temperature and a foaming grade with an index of refraction of approximately 2.6 and an increased melting temperature.

11. The combination set forth in claim 6 wherein the thermoplastic material constitutes an acrylonitrile butadiene styrene and
the chemical agent is dispersed throughout the thermoplastic material in a range of approximately four percent (4%) to ten percent (10%) by weight.

12. A method of making anti-static material having a resistivity in the range of approximately $10^{11}$ to $10^{12}$ ohms, including the following steps:

providing a thermoplastic material selected from a group consisting of polystyrene and a modified styrene,
mixing the thermoplastic material and an ethoxylated amine in a range of approximately four percent (4%) to twelve percent (12%) by weight, and
extruding the mixture of the thermoplastic material and the ethoxylated amine at a controlled temperature below approximately 450° F. and a controlled pressure below approximately 1,000 psi and a controlled dwell time below approximately three (3) minutes.

13. The method set forth in claim 12 wherein the controlled temperature during the extrusion is less than approximately 450° F. with the thermoplastic material constituting a polystyrene and is less than approximately 395° F. with the thermoplastic material constituting a modified styrene.

14. The method set forth in claim 12 wherein the modified styrene is selected from a group consisting of a vacuum forming grade with an index of refraction of approximately 2.2 and a low melting temperature and a foaming grade with an index of approximately 2.6 and an increased melting temperature and
the ethoxylated amines have a range by weight of approximately four percent (4%) to ten percent (10%).

15. The method set forth in claim 14 wherein the pressure is between approximately 800 psi and 1,000 psi and
the dwell time is between approximately two (2) and three (3) minutes.

16. The method set forth in claim 15 wherein the thermoplastic material and the ethoxylated amine are vented to the atmosphere during the extrusion.

17. The method set forth in claim 14 wherein the thermoplastic material is an acrylonitrile butadiene styrene,
the ethoxylated amine has a range of approximately four percent (4%) to ten percent (10%) by weight,
the pressure is between eight hundred pounds (800 lbs.) and one thousand pounds (1,000 lbs.) per square inch and
the controlled temperature is less than 395° F.

18. The method set forth in claim 12 wherein the thermoplastic material is a polystrene selected from a group consisting of high impact and crystal polystyrene
the ethoxylated amine has a range of approximately eight percent (8%) to twelve (12%) by weight and
the pressure is between eight hundred pounds (800 lbs.) and one thousand pounds (1,000 lbs.) per square inch.

19. The method set forth in claim 18 wherein the pressure is between approximately 800 psi and 1,000 psi and
the dwell time is between approximately two (2) and three (3) minutes.

20. The method set forth in claim 19 wherein the thermoplastic material and the ethoxylated amine agent are vented to the atmosphere during the extrusion.

* * * * *